W. C. STEVENS.
METHOD OF MAKING SOLID TIRES.
APPLICATION FILED FEB. 5, 1917.
1,276,821.
Patented Aug. 27, 1918.
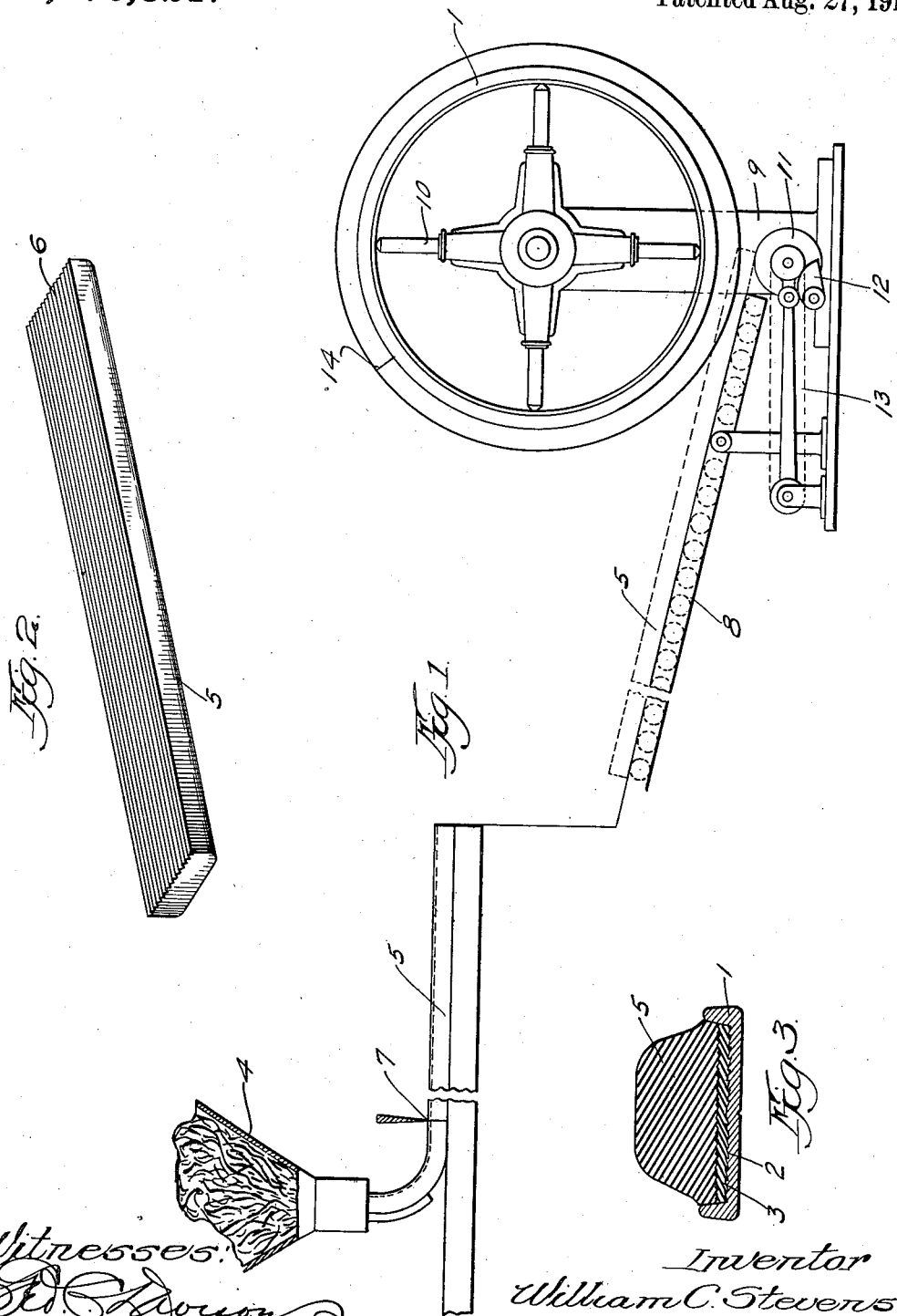
Witnesses:
Inventor
William C. Stevens
By Wilkinson + Huxley
Attys.

UNITED STATES PATENT OFFICE.

WILLIAM C. STEVENS, OF SUMMIT, OHIO, ASSIGNOR TO THE FIRESTONE TIRE AND RUBBER COMPANY, OF AKRON, OHIO, A CORPORATION OF OHIO.

METHOD OF MAKING SOLID TIRES.

1,276,821.   Specification of Letters Patent.   Patented Aug. 27, 1918.

Application filed February 5, 1917. Serial No. 146,695.

*To all whom it may concern:*

Be it known that I, WILLIAM C. STEVENS, a citizen of the United States, residing in the county of Summit, State of Ohio, have invented certain new and useful Improvements in Methods of Making Solid Tires, of which the following is a specification.

My invention relates to a method of manufacturing what are commonly termed "hard base" tires, by which is meant cushion tires which are secured to a steel base by vulcanizing, a layer of hard rubber being interposed between the cushion portion of the tire and the steel base, this intermediate layer serving to hold the softer rubber tire on the steel base. In the manufacture of these tires it has been customary to build up the hard rubber base and the cushion portion of the tire by calendering out the rubber composition into thin layers which are wound around the steel base or rim until the proper thickness is attained. In the case of the upper or cushion part of the tire it has been customary to form the tire of numerous layers or laminations and then remove the excess rubber by trimming the irregular annular tire down to approximately the shape of the finished tire, taking careful weighings of the parts removed until the tire is down to the volume required for the particular size of tire being manufactured. The calendering operations on both the hard and soft rubber portions of the tires is a tedious one and requires the time and attention of skilled operators.

The method described in this application reduces the cost of manufacture of these tires materially, and results in a superior tire in respect to service obtained. There is no tendency to separation of laminations of the cushion of the tire such as was frequently experienced in the calendered tires.

In the drawings accompanying this application I have shown more or less diagrammatically such of the steps in the manufacture of these tires as are capable of illustration.

Figure 1 shows the method of forming the tire from rubber compounds and placing it about the rim or steel base.

Fig. 2 is a perspective view of an extruded cushion portion of the tire, and

Fig. 3 is a cross section of a finished hard base tire.

The steel base or rim of the tire is shown at 1 in the accompanying drawing and may be in the form of a channel or may be of flat cross section. The base is scored on the upper side with sharp toothed ridges or grooves 2, which form a gripping surface for the hard rubber base 3. Before any rubber is placed on the rim it is given an electro-plating of brass and then a coating of rubber cement. The hard base 3 is applied, which may be done either by calendering, by which is meant the winding of a thin sheet from a calender around the rim under pressure, or by "tubing," or extruding from a die a sheet of hard rubber composition of the required thickness which is cut to proper length and brought around the tire. The hard rubber base is now given a coating of rubber cement and roughened or buffed with steel brushes, which serves to give it an irregular surface to afford a firm interlocking between the two rubber portions of the tire. The coated and roughened base is warmed to dry the rim and prepare it to receive the cushion.

Suitable rubber compounds are placed in the hopper of an extruding or tube machine 4, the mouth of which is heated. The rubber is forced out in a straight strip or ribbon 5. The mouth of the die is formed so that the extruded strip of rubber approximates the shape of the completed tire, and is formed on one side with a series of longitudinal corrugations 6, which assist in the union between the two rubber components of the tire. When the tire has protruded from the die a sufficient length the leading end is cut off as at 7 to a length equal to the circumference of the rim base. If desired, the severed portion may be weighed, thus checking the amount of rubber required for molding the tire. The band of rubber is now washed on the under side and ends with benzol to remove any grease or dirt which may have gotten on the rubber and would interfere with a perfect union between the hard base and the cushion of the tire, and to render it tacky to adhere thereto.

The cushion is now ready to be applied to the rim, which is done while both parts are warm. In the drawings there are shown parts of a machine which will perform this step of the process. The severed portion of the tire being warmed from the die and having been prepared in the manner described above, is placed on a runway or incline 8, the lower end of which terminates adjacent an upright 9 which carries a rotatable chuck 10, adapted to hold and rotate the rim base 1, which is warmed from the drying process. A shiftable roller 11 may be mounted in the stand and is adapted to be rocked upwardly by a cam 12 under control of the operator. The roller is driven by a sprocket chain 13 from any source of power. It will be seen that as the cam 12 is operated to rock the roller against the surface of the tire, the rim will be rotated drawing the tire 5, which, owing to the adherent quality of the cement coated hard rubber base, adheres to the base and will be wrapped around forming a complete uncured tire. The ends of the cushion tire are brought together as at 14 and butted squarely against each other, being rolled into close adhesion by means of hand rollers. The tire is now ready to be vulcanized, which serves to firmly adhere the hard base to the rim and the cushion to the hard base.

It is obvious that changes and variations in the method of making solid tires may be made without sacrificing any of the benefits of the invention, and are within the scope of the invention as set forth in the appended claims.

Claims—

1. The method of making "hard base" tires, comprising forming a base of hard rubber on a rim, extruding the cushion portion of the tire, placing said cushion portion on said rim and on said previously applied hard base and vulcanizing.

2. The method of making "hard base" tires, comprising forming a base of hard rubber on a rim, extruding the cushion portion of the tire in approximately the cross section of a finished tire, placing said cushion portion on said rim and on said previously applied hard base and vulcanizing.

3. The method of making "hard base" tires, comprising forming a base of hard rubber on a rim, shaping the cushion portion of the tire to approximately the cross section of the finished tire, cutting said cushion portion to a length sufficient to encircle the rim, encircling said cushion portion about said rim and on said previously applied hard base, and vulcanizing.

4. The method of making "hard base" tires, comprising forming a base of hard rubber on a rim, extruding the cushion portion of the tire, cutting said cushion portion into a length sufficient to encircle the rim, encircling said cut cushion portion about said rim and on said previously applied "hard base" and vulcanizing.

5. The method of making "hard base" tires, comprising forming a base of hard rubber on a rim, extruding the cushion portion of the tire in approximately the cross section of the finished tire, cutting said cushion portion into a length sufficient to encircle the rim, placing said cushion portion on said rim and on said previously applied hard base and vulcanizing.

6. The method of making "hard base" tires, comprising forming the "hard base" portion by extrusion, wrapping a length sufficient to go about a rim, superposing a cushion portion over said "hard base" and vulcanizing.

7. The method of making "hard base" tires, comprising forming the "hard base" portion by extrusion, wrapping a length sufficient to go about a rim, forming a cushion portion by extrusion, superposing said cushion portion over said "hard base" and vulcanizing.

8. The method of making "hard base" tires, comprising forming the "hard base" portion by extrusion, wrapping a length sufficient to go about a rim, forming a cushion portion by extrusion, wrapping said cushion portion over said "hard base," rolling it in place and vulcanizing.

9. The method of making "hard base" tires, comprising forming the "hard base" portion by extrusion, wrapping a length sufficient to go about a rim, warming said rim, forming a cushion portion by extrusion, warming said cushion portion, wrapping said cushion portion over said "hard base" while the rim and portion are warm and vulcanizing.

WILLIAM C. STEVENS.